United States Patent [19]

Blase

[11] Patent Number: 5,445,569
[45] Date of Patent: Aug. 29, 1995

[54] POWER TRANSMISSION CHAIN

[75] Inventor: Gunter Blase, Bergisch Gladbach, Germany

[73] Assignee: Igus Spritzgussteile fur die Industrie GmbH, Köln, Germany

[21] Appl. No.: 150,134
[22] PCT Filed: Mar. 30, 1993
[86] PCT No.: PCT/DE93/00296
 § 371 Date: Jun. 2, 1994
 § 102(e) Date: Jun. 2, 1994
[87] PCT Pub. No.: WO93/20366
 PCT Pub. Date: Oct. 14, 1993

[30] Foreign Application Priority Data

Apr. 1, 1992 [DE] Germany ............ 42 10 674.5

[51] Int. Cl.⁶ ................................ F16G 13/16
[52] U.S. Cl. ........................... 474/145; 474/227
[58] Field of Search ............ 474/101, 144, 145, 150, 474/201, 223, 226–228, 232, 242

[56] References Cited

U.S. PATENT DOCUMENTS

| | | | |
|---|---|---|---|
| 593,254 | 11/1897 | Thomson | 474/145 |
| 702,775 | 6/1902 | Catchpool | 474/145 |
| 1,082,332 | 12/1913 | Howe et al. | 474/228 X |
| 2,264,529 | 12/1941 | Herman | 474/228 X |
| 2,909,937 | 10/1959 | Williams | 474/145 X |
| 3,515,013 | 6/1970 | Wykes | 474/145 |
| 4,306,753 | 12/1981 | Livesay et al. | 474/227 X |
| 4,392,344 | 7/1983 | Gordon et al. | 59/78.1 |
| 4,664,253 | 5/1987 | Fahrion | 474/145 X |
| 4,854,924 | 8/1989 | Nagano | 474/145 X |

FOREIGN PATENT DOCUMENTS

| | | |
|---|---|---|
| 3613431 | 10/1987 | Germany . |
| 3928237 | 8/1990 | Germany . |
| 3930291 | 4/1991 | Germany . |

Primary Examiner—Roger J. Schoeppel
Attorney, Agent, or Firm—Browdy and Neimark

[57] ABSTRACT

In a power transmission chain, each link of which displays two side walls and a stabilizing element joining these at their lower longitudinal edges, as well as a cover which can be snapped onto the upper longitudinal edges, where consecutive links are joined in pivoting fashion and the covers can be fixed on the upper longitudinal edges of the side walls in a detachable fashion, the covers are connected via flat, flexible connecting straps located in sliding fashion in corresponding sliding chambers in the covers. A power transmission chain of this kind can be manufactured with very small dimensions, has adequate assembly strength and can be handled conveniently and safely.

20 Claims, 4 Drawing Sheets

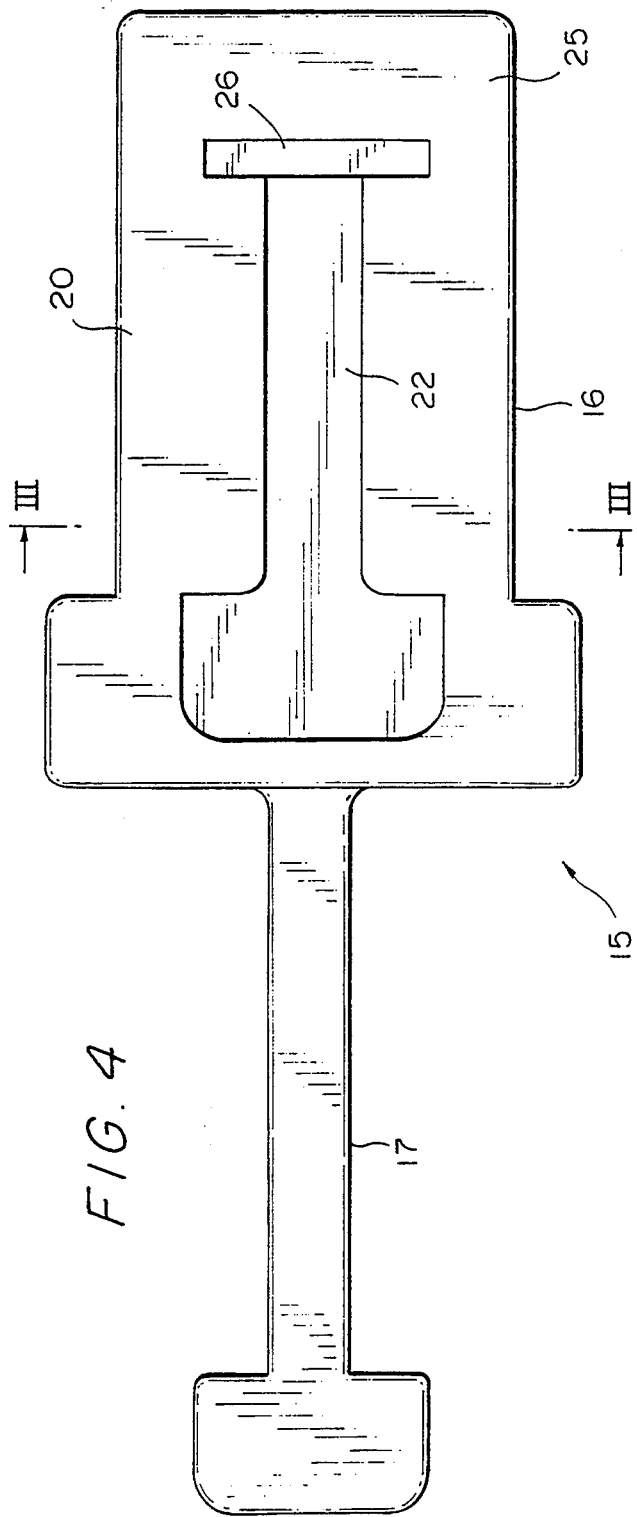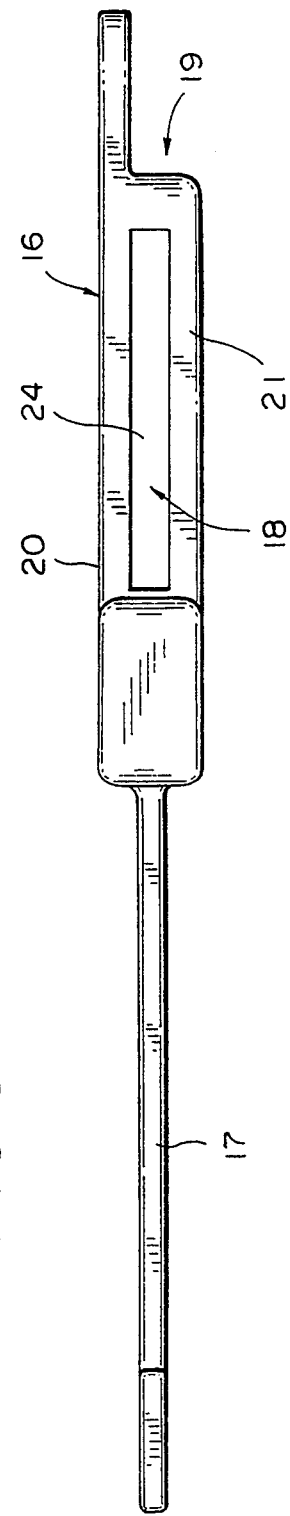
FIG. 4
FIG. 5

POWER TRANSMISSION CHAIN

BACKGROUND OF THE INVENTION

1. Technical Field of the Invention

The invention relates to a power transmission chain, each link of which displays two side walls and a stabilising element joining these at their longitudinal edges, as well as a cover which connects the two side walls and can be snapped onto one and/or both pairs of longitudinal edges. The consecutive links are joined in pivoting fashion, the covers can be fixed on the corresponding longitudinal edges of the side walls in a detachable fashion, and the covers of consecutive links can be connected together.

2. Prior Art

A power transmission chain of this kind is known, for example, from DE-PS 3930291. The power transmission chain described there consists of links comprising two side walls, a cross-member connecting these, and a snap-on cover. The covers of the power transmission chain are provided with claws, the upper edges of the side walls with snap-in cut-outs for detachable accommodation of the claws, and the covers are joined in pivoting fashion by round bars and slots to accommodate them. Slits are provided which permit engagement of the round bars into the slits and withdrawal therefrom. One particular advantage of power transmission chains of this kind is that the covers can be detached or torn off in a continuous strip.

The use of such power transmission chains, which have proven successful in numerous practical applications, is also conceivable and desirable in computers, business machines, measuring instruments or other electrical equipment in which very small cables or wires are used.

One disadvantage of the power transmission chain known from DE-PS 3930291 is the fact that there are limits on the smallest size in which it can be manufactured. On the one hand, important parts, such as the round bar described in DE-PS 3930291, lose the strength necessary for removing the covers and, on the other hand, there is a disproportionately great reduction of the space available for these parts. This means that the overall height available for the cover connecting elements is reduced to such an extent that these can no longer be manufactured with sufficient strength. Furthermore, the connecting elements (round bars and slotted slits) also become more difficult to handle. A reduction of the inside dimensions of the power transmission chain, in order to create the desired design space, is undesirable, as the ratio of the inside dimensions to the outside dimensions of the power transmission chain sealed with covers should preferably be identical in all sizes of power transmission chain.

Furthermore, in the power transmission chain designed according to the principle described above, when the chain links are deflected at large angles relative to each other, very high frictional forces occur in the area where said round bar comes into contact with the upper or lower wall of the slot, depending on the direction in which the chain links are deflected. These frictional forces have virtually no effect in the case of large links. However, if the scale of the links were to be greatly reduced, the frictional forces would severely impair the running properties of the power transmission chain. Consequently, it would not be possible to select a very small value for the rolling radius, i.e. the distance between upper strand and lower strand when deflecting the chain.

OBJECT AND SUMMARY OF THE INVENTION

Therefore, the task of the present invention is, while retaining the principle of the power transmission chain with pivoting covers and its associated advantages, to create a power transmission chain which can be manufactured with very small dimensions, has adequate assembly strength and can be handled conveniently and safety, without involving the disadvantages mentioned at the beginning.

According to the invention, the task is solved by the fact that the cover has a connecting strap on one of its face ends, the cover has a sliding chamber to accommodate a connecting strap of an adjacent cover, the connecting strap of the adjacent cover can be displaced longitudinally in the sliding chamber, the sliding chamber has communicating openings on the outward-facing side of the cover and on the face end pointing away from the connecting strap, the openings in the sliding chamber are adapted to the shape of the connecting strap in such a way that the connecting strap of the adjacent cover can be inserted into and withdrawn from them in one position, being held captive by the limits of the sliding chamber following longitudinal displacement into any other position.

Thus, according to the present invention, one cover can be connected to the other by means of a connecting strap which displays adequate strength even in small dimensions. The connecting strap is inserted into the sliding chamber of an adjacent cover and, following longitudinal displacement, is held firmly captive in such a way that any desired number of covers can be joined together into a strip and fixed on the power transmission chain. The connecting straps have sufficient strength, while requiring a minimum of design space, meaning that very small covers, in particular, can easily be pulled off the corresponding power transmission chain in a single strip. Furthermore, the possibility of displacing the connecting strap longitudinally in the sliding chamber guarantees that, when assembled, the connected covers adapt to any deflection angle of the power transmission chain and an extremely small rolling radius can be selected for the chain.

In this context, it is advantageous for the extent of the longitudinal displacement of the connecting strap in the sliding chamber of the adjacent cover to be adapted to the possible deflection of the chain links relative to each other.

The connecting strap is preferably designed in one piece with the cover and in the form of a flexible, flat strip of rectangular cross-section. A flexible, flat strip is particularly resistant to tensile stresses, this being an advantage when removing the strip of covers. Furthermore, a strip of rectangular cross-section can be bent particularly easily in the direction of its smallest dimension and is characterised by its small overall height.

In the preferred embodiment, the free end of the connecting strap widens out into a T-shape. The opening on the outward-facing side of the sliding chamber is also expediently of T-shaped design, in keeping with the shape of the connecting strap. Thus, the connecting strap can only be inserted into the sliding chamber when its contour coincides with the contour of the opening in the sliding chamber. Obviously, the use of any other shape for the connecting strap and the opening in the sliding chamber is conceivable, as long as the principle described above is realised.

The opening on the face end of the sliding chamber facing away from the connecting strap is preferably smaller than the wider T-shaped part, so that it forms a limit stop for the connecting strap of the adjacent cover.

To prevent the connecting strap from accidentally slipping out of the sliding chamber during deflection of the power transmission chain, it can preferably only be inserted into and withdrawn from the sliding chamber of the adjacent cover when the cover connected to it has not been snap-fitted onto a chain link.

In the preferred embodiment, the cover is provided with a projection, running in the longitudinal direction of the cover, on the face end pointing away from the associated connecting strap. When the chain is extended, this projection serves to cover the pivoting joint of the chain links, so that the power transmission chain is almost entirely closed when in its extended position.

The width of the protrusion can essentially correspond to the width of the cover and have a cut-out, the width of which essentially corresponds to the width of the wider, T-shaped end of the connecting strap. It serves to guide and retain the connecting strap when the chain is in a deflected position. When the covers are connected to each other, the connecting strap of the adjacent cover is pushed through the cut-out from below and then inserted into the sliding chamber.

The stabilising element is preferably a cross-member which connects the side walls at their lower longitudinal edges in a single piece.

In order to protect the cables located inside the power transmission chain, the side walls are fitted with mechanical stops to limit the pivoting of the chain links, so that the power transmission chain cannot be bent without restriction.

The cover is expediently fitted with claws which can be accommodated in detachable form by snap-in cut-outs on the upper longitudinal edges of the side walls.

In the preferred embodiment, the side walls display a detent spring extending inwards on their inner sides. Accordingly, the sliding chamber has an opening on its longitudinal sides, which the detent spring of the corresponding side wall of the chain link engages when the cover is snap-mounted.

BRIEF DESCRIPTION OF THE DRAWINGS

An example of the invention is illustrated in the drawings and described in detail below.

The drawings show the following:

FIG. 4 A top view of the side of the cover facing outwards;

FIG. 5 A side view of the cover;

DETAILED DESCRIPTION OF THE PREFERRED EMBODIMENT(S)

Figure 1:
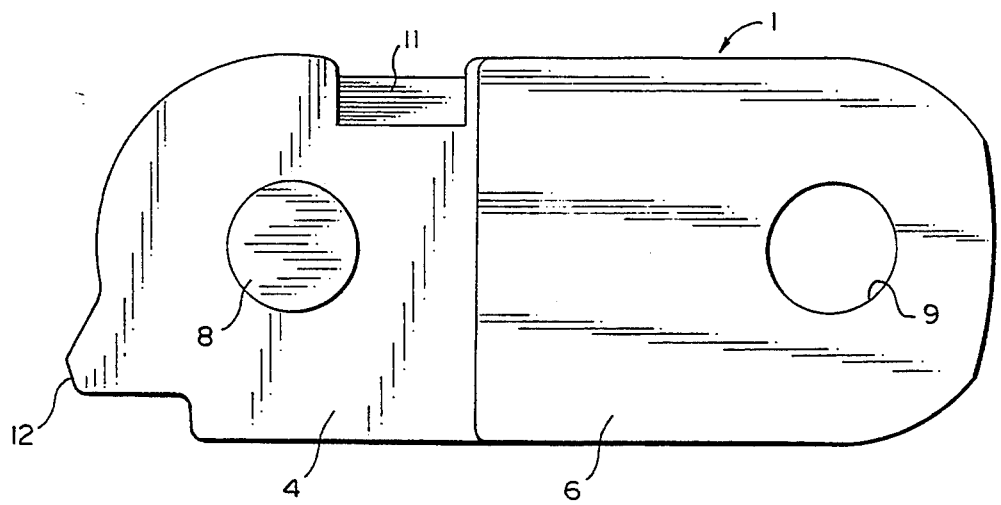
FIG. 1 A side view of the chain link with cover removed.
Figure 2:
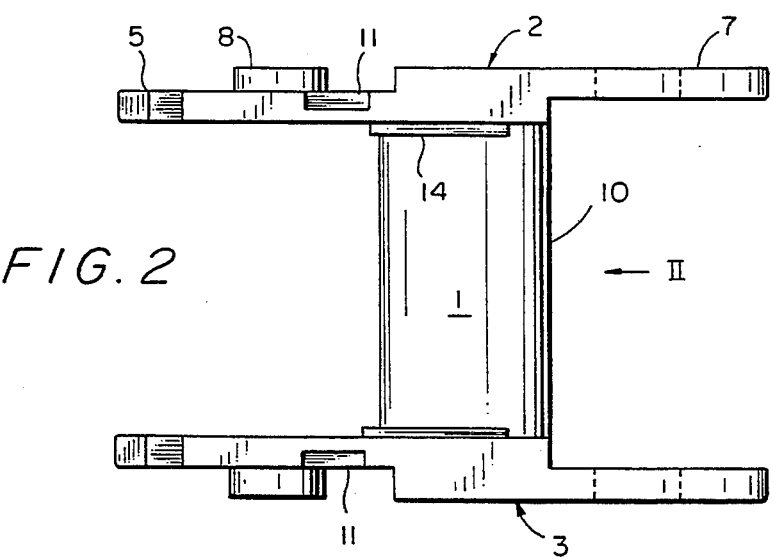
FIG. 2 A top view of the chain link.

As can be seen from the drawings, the individual chain links 1 each comprise side walls 2 and 3, inwardly offset parts 4 and 5, and outwardly offset parts 6 and 7. Pegs 8 protrude from the side of inwardly offset parts 4 and 5, while the outwardly offset parts display holes 9 at the corresponding points. The arrangement and dimensions of holes 9 and pegs 8 are selected in such a way that the pegs 8 of a chain link 1 engage the holes 9 of an adjacent chain link, so that the chain links are connected in pivoting fashion.

The lower sides of side walls 2 and 3 are connected in a single piece by cross-member 10. On their top side, chain links 1 can be tightly closed by means of a cover. Snap-in cut-outs 11 for detachable accommodation of the covers are provided on the top side of the side walls for this purpose.

Figure 3:
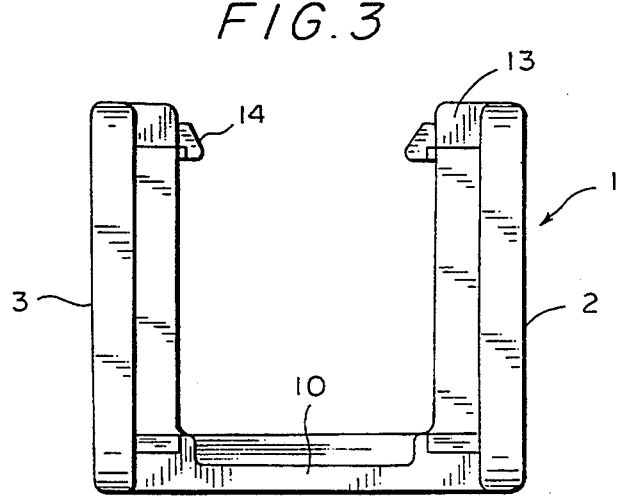
FIG. 3 A view in the direction of arrow II in FIG. 1.
Figure 8:
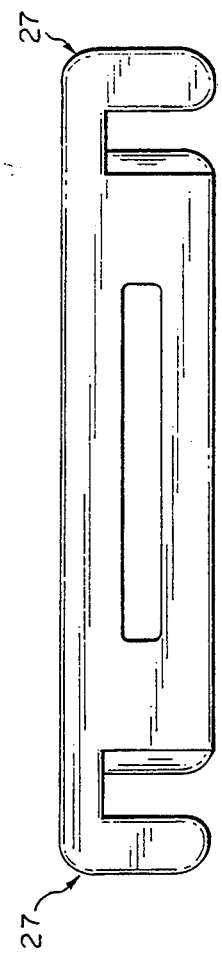
Figure 6:
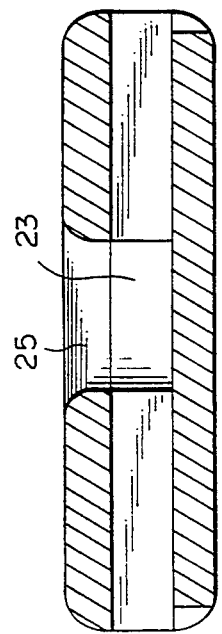
FIG. 6 A section along line III—III in FIG. 4.

In order to limit any deflection of the chain links relative to each other, inwardly offset parts 4 and 5 of side walls 2 and 3 are provided with lugs 12, which run up against cross-member 10 when the links are deflected relative to each other into an extended position, and against restraining strips 13, located on the upper edges of side walls 2 and 3, upon deflection in the opposite direction, thus forming a mechanical stop. The location of restraining strips 13 can best be seen from FIG. 3.

In addition, detent springs 14 are located on the inner sides of the restraining strips, engaging the cover when snapped onto it.

Cover 15, which is provided to cover the top side of each chain link, is illustrated in FIGS. 4 to 8. Cover 15 consists of a basic body 16 and a flexible connecting strap 17, designed to form a single piece with it. Connecting strap 17 widens into a T-shape at its outer end. Basic body 16 defines a sliding chamber 18 with an essentially rectangular cross-section to accommodate a connecting strap of an adjacent cover. Sliding chamber 18 is respectively provided with openings 22, 23 and 24, strap 17, on its outward-facing side 20 on its face end 19, pointing away from connecting and on its longitudinal sides 21. The shape of upper opening 22 corresponds to the shape of connecting strap 17. Opening 23 on face end 19 of sliding chamber 18 is smaller than the wider, T-shaped end of connecting strap 17, with the result that face end 19 forms a mechanical stop for the wider, T-shaped end of connecting strap 17, once connecting strap 17 of the adjacent cover has been inserted into sliding chamber 18.

Above opening 23 is a projection 25, which is also provided with a cut-out. This cut-out 26 has dimensions which essentially correspond to the dimensions of the wider, T-shaped end of connecting strap 17.

Figure 7:
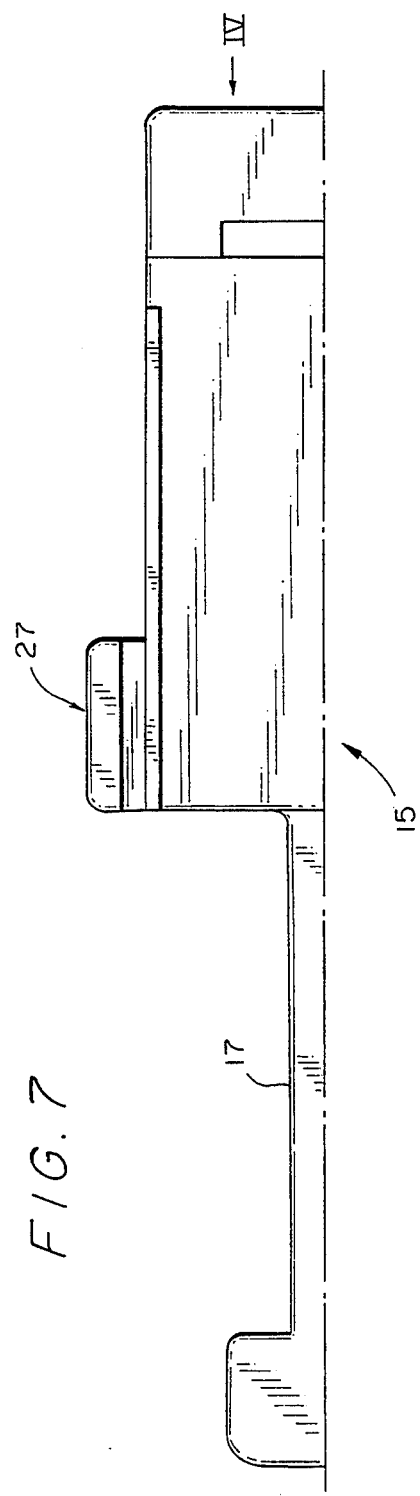
FIG. 7 A bottom view of the cover, where the axially symmetrical part is not shown, and FIG. 8 A view in the direction of arrow IV in FIG. 7.
Figure 9:
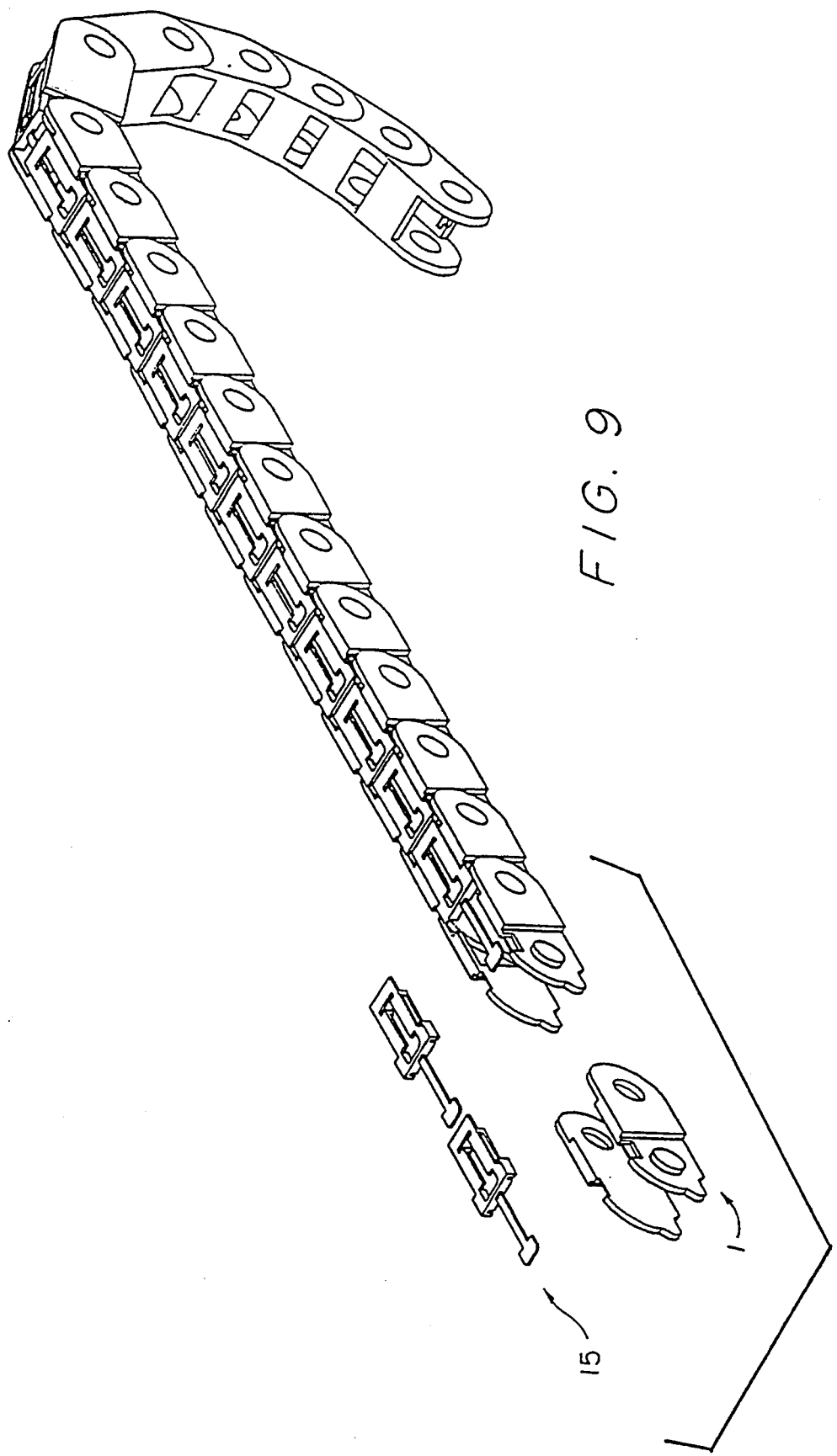
FIG. 9 A perspective partially exploded view of the power transmission chain.

As can be seen from the bottom view of the cover in FIG. 7, claws 27 are integrally moulded onto the sides of basic body 16 of cover 15, which engage snap-in cut-outs 11 when cover 15 is fitted onto a chain link 1.

To assemble covers 15 on the power transmission chain, connecting strap 17 of the respective adjacent cover is pushed through cut-out 26 in projection 25 from below and then positioned to coincide with upper opening 22 of sliding chamber 18. Connecting strap 17 can easily be inserted into sliding chamber 18 in this position.

Once several covers have been connected in this way, the first cover 15 is snap-fitted onto the corresponding chain link 1. In this process, claws 27 engage the associated snap-in cut-outs 11, and detent springs 14 snap into lateral openings 24 of sliding chamber 18. The remaining covers are slightly displaced relative to each other for snap-mounting on chain links 1. The dimensions of covers 15 are selected such that, when covers 15 have been snap-mounted, the corresponding connecting strap 17 is located in sliding chamber 18 in such a way that it is reliably prevented from jumping out of sliding chamber 18. As connecting straps 17 are capable of longitudinal displacement in the associated sliding chambers 18, the continuous strip of covers adapts to any deflection of the chain links relative to each other.

To detach the covers, a free connecting strap can be pulled in the direction of face end 19, so that the entire strip of covers is detached from the power transmission chain.

| List of reference numbers | |
|---|---|
| 1 | Chain link |
| 2 | Side wall |
| 3 | Side wall |
| 4 | Inwardly offset part |
| 5 | Inwardly offset part |
| 6 | Outwardly offset part |
| 7 | Outwardly offset part |
| 8 | Peg |
| 9 | Holes |
| 10 | Cross-member |
| 11 | Snap-in cut outs |
| 12 | Lug |
| 13 | Restraining strip |
| 14 | Detent spring |
| 15 | Cover |
| 16 | Basic body of the cover |
| 17 | Connecting strap |
| 18 | Sliding chamber |
| 19 | Face end of the sliding chamber pointing away from the connecting strap |
| 20 | Outward-facing side of the sliding chamber |
| 21 | Longitudinal side of the sliding chamber |
| 22 | Upper opening of the sliding chamber |
| 23 | Opening on the face end of the sliding chamber |
| 24 | Opening on the longitudinal side of the sliding chamber |
| 25 | Projection |
| 26 | Cut-out |
| 27 | Claw |

I claim:

1. Power transmission chain, each link of which displays two side walls and a stabilising element joining these at their longitudinal edges, as well as a cover which connects the two side walls and can be snapped onto one and/or both pairs of longitudinal edges, where the consecutive links are joined in pivoting fashion, the covers can be fixed on the corresponding longitudinal edges of the side walls in a detachable fashion, and the covers of consecutive links can be connected together, characterised in that the cover (15) has a connecting strap (17) on one of its face ends, the cover (15) has a sliding chamber (18) to accommodate a connecting strap (17) of an adjacent cover (15), the connecting strap (17) of the adjacent cover (15) can be displaced longitudinally in the sliding chamber (18), the sliding chamber (18) has communicating openings (22, 23) on the outward-facing side of the cover (15) and on the face end pointing away from the connecting strap (17), the openings (22, 23) in the sliding chamber (18) are adapted to the shape of the connecting strap (17) in such a way that the connecting strap (17) of the adjacent cover (15) can be inserted into and withdrawn from them in one position, being held captive by the limits of the sliding chamber (18) following longitudinal displacement into any other position.

2. Power transmission chain as per claim 1, characterised in that the extent of a longitudinal displacement of the connecting strap (17) in the sliding chamber (18) of the adjacent cover (15) is adapted to the possible deflection of the chain links (1) relative to each other.

3. Power transmission chain as per claim 1, characterised in that the connecting strap (17) comprises a single piece with the cover (15).

4. Power transmission chain as per claim 1, characterised in that the cover (15) is provided with claws (27) which can be accommodated in detachable form by snap-in cut-outs (11) on the upper longitudinal edges of the side walls (2, 3).

5. Power transmission chain as per claim 1, characterised in that the free end of the connecting strap (17) widens out into a T-shape.

6. Power transmission chain as per claim 5, characterised in that a first opening (22) of said openings on the outward-facing side of the sliding chamber (18) is T-shaped in keeping with the shape of the connecting strap (17).

7. Power transmission chain as per claim 5, characterised in that a second opening (23) of said openings on the face end of the sliding chamber (18) facing away from the connecting strap (17) is smaller than the wider, shaped part.

8. Power transmission chain as per claim 1, characterised in that the connecting strap (17) can only be inserted into and withdrawn from the sliding chamber (18) of the adjacent cover (15) if the cover (15) connected to it has not been snapped onto a chain link (1).

9. Power transmission chain as per claim 1, characterised in that the cover (15) has a projection (25), extending in the longitudinal direction of the cover, on the face end pointing away from the associated connecting strap (17).

10. Power transmission chain as per claim 9, characterised in that the width of the projection (25) essentially corresponds to the width of the cover (15) and that the projection (25) has a cut-out (26), the width of which essentially corresponds to the width of the wider, T-shaped part of the connecting strap (17).

11. Power transmission chain as per claim 1, characterised in that the stabilising element consists of a cross-member (10) connecting the side walls (2, 3) at their lower longitudinal edges in a single piece.

12. Power transmission chain as per claim 1, characterised in that the side walls (2, 3) are provided with stops to limit the deflection of the chain links (1).

13. Power transmission chain as per one of claim 1, characterised in that the side walls (2, 3) display a detent spring (14) extending inwards on their inner sides.

14. Power transmission chain as per claim 13, characterised in that the sliding chamber (18) has an opening (24) on each of its longitudinal sides, which the detent spring (14) of the corresponding side wall (2, 3) of the chain link (1) engages when the cover (15) is snap-mounted.

15. Power transmission chain as per claim 1, characterised in that the connecting strap (17) comprises a flexible, flat strip of rectangular cross-section.

16. Power transmission chain as per claim 15, characterised in that the free end of the connecting strap (17) widens out into a T-shape.

17. Power transmission chain as per claim 16, characterised in that the cover (15) has a projection (25), extending in the longitudinal direction of the cover, on the face end pointing away from the associated connecting strap (17).

18. Power transmission chain as per claim 17 characterised in that the stabilising element consists of a cross-member (10) connecting the side walls (2, 3) at their lower longitudinal edges in a single piece.

19. Power transmission chain as per claim 18, characterised in that the side walls (2, 3) are provided with stops to limit the deflection of the chain links (1).

20. Power transmission chain as per claim 19, characterised in that the side walls (2, 3) display a detent spring (14) extending inwards on their inner sides.

* * * * *